UNITED STATES PATENT OFFICE.

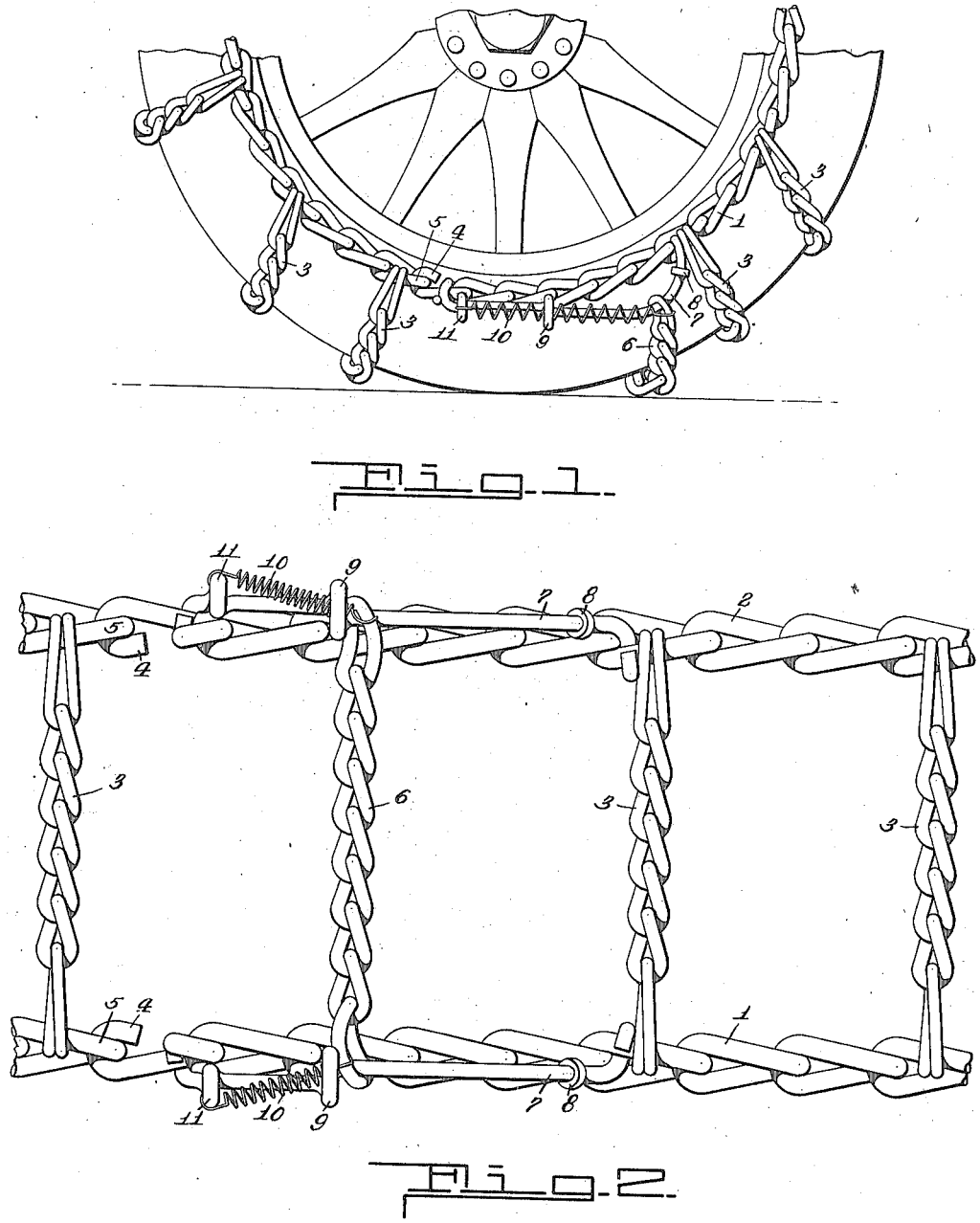

WALTER L. SMITH, OF NEW YORK, N. Y.

TIRE-CHAIN.

1,267,925.  Specification of Letters Patent.  Patented May 28, 1918.

Application filed October 2, 1917. Serial No. 194,313.

*To all whom it may concern:*

Be it known that I, WALTER L. SMITH, a citizen of the United States, residing at New York, in the county of New York and State of New York, have invented certain new and useful Improvements in Tire-Chains, of which the following is a full, clear, and exact description, such as will enable others skilled in the art to which it appertains to make and use the same.

This invention relates to tire chains and similar devices employed as gripping elements between automobile tires and a road surface.

One of the objects of the invention is to provide a practical device of the character mentioned and in which easy mounting and efficient operation are assured.

The invention, in some respects, is designed to constitute a subordinate improvement to the structure described and claimed in my co-pending application, filed April 6, 1917, Serial No. 160,078.

Additional objects and certain advantages of the invention will in part be noted hereinafter in connection with the description of the accompanying drawing, which illustrates a typical embodiment of the invention, and in which—

Figure 1 is a fragmentary side elevational view of the improved device as mounted about a vehicle tire; and Fig. 2 is a fragmentary plan view of the device, detached.

The tire chain as shown includes a pair of longitudinal side chains 1, 2, which are interconnected at preferably equi-distant intervals by a plurality of fixed cross chains 3. As is common in devices such as thus far described, the elements 3 are preferably spaced apart a distance less than the arcuate dimension of the tire tread in close proximity to its normal horizontal supporting surface, whereby the constant interposition of at least one of the cross chains between the road and the tire, when running is insured. The device as a whole is constructed to encircle the tire periphery, and the flexible side members may be conveniently provided with terminal interengaging parts, such as hooks 4 and eyes 5.

For the purposes more fully set forth in my co-pending application above referred to, there is also provided an auxiliary cross chain 6 associated with the side members, adjacent one end of the latter. In the form illustrated by the drawing herein, the auxiliary cross chain 6 has its end links on opposite bowed rods 7, which are in turn secured to the side members between the adjacent terminal fixed cross chain and the corresponding free end of the side chains. The assembly of the auxiliary cross element and the shape and dimension of the rods 7 are such that the former is capable of sliding movement thereover in a longitudinal direction with respect to the side chains, whereby the free terminal extent of the latter may be increased, when desired, by manipulation. Such movement of the auxiliary member may be limited in one direction by a fixed collar 8 and in the other direction by an abutment 9. In practice, and for another function hereinafter set forth, the abutment 9 may conveniently be constituted by a right angled loop or bend in the rods 7. By reason of the outwardly bowed contour of the rods 7, it will also be noted that chain 6, when moved toward the adjacent fixed cross chain, is radially displaced, whereby in mounting it may assume increased looseness with respect to the tire. Conversely, after mounting and in operation, it becomes gradually tautened to a degree uniform with the remaining cross chains, as it works back toward the end of the side chains.

The device is applied to the wheel by wrapping the same about the tire and interlocking the ends of the side members. In this operation the chain is positioned initially with the auxiliary cross member 6 in rear of the point of contact between the tire and the ground, whereby, as the device is wrapped around the wheel, the space between the auxiliary cross chain and the terminal cross chain at the opposite end of the side chains, may be lengthened by displacing member 6 and thus made greater than the arc of contact or close adjacency between the tire and its supporting surface. This increased spacing at the point mentioned permits ready interengagement of the ends of the longitudinal side members without rotating or elevating the vehicle wheel.

Due to the relative looseness of the auxiliary cross chain when positioned as shown in Fig. 1, and to the curved form of the rods 7, assisted also by the transverse rings 9 which may hold the rods 7 slightly away from the tire, the auxiliary element is free for reverse sliding movement on the rods toward the interlocked uniting ends of the side chains and in a direction reverse to the forward rotation of the wheel, and will assume a relatively tightened grip about the tire at a position midway between the opposite adjacent fixed cross chains.

In order to expedite such independent creeping of the auxiliary chain to assume symmetrical disposal with respect to the fixed cross chains, there are provided resilient means, shown as coil springs 10 respectively extended between end rings or loops 11 of the rods 7 and the end links of the auxiliary cross chain. If desired, springs 10 may be extended through rod loops 9, and are readily extensible to permit withdrawal of the auxiliary element in mounting the device. Normally, however, the springs exert a force tending to return or maintain the auxiliary member in position toward or against the loops 9 and midway between the adjacent fixed cross chains, as shown in Fig. 2.

After assembly of the chain about the wheel, as described, it will thus be apparent that the auxiliary cross member promptly and certainly assumes its normal operating position, which will insure, during running, the interposition of at least one cross member between the road and the tire at all times. It may be noted, also, that the device as a whole is free to creep about the tire periphery to insure uniformity of wear.

It is to be understood, further, that my invention may be embodied efficiently in parts adapted for application to existing anti-skid devices, and that it may also be embodied in forms different from the construction illustrated while retaining the structural superiority and functional advantages indicated. For example, it will be observed that the combination of the auxiliary cross chain, its supporting rods 7 and the springs constitue, in a sense, a unit and as such are capable of separate manufacture. Or, the device may as well be embodied as an integral part of the complete chains when manufactured.

Having described my invention, what I claim as new and desire to secure by Letters Patent is:

1. In a tire chain including side members and a plurality of cross members fixed thereto at intervals, said side members having interengaging parts whereby the whole is adapted to encircle the tire, the combination of an auxiliary cross member adjacent one end of said side members and arranged for limited movement toward the adjacent fixed cross member in mounting, and means positively urging said auxiliary member toward the limit of its movement adjacent said end of said side members.

2. A tire chain including in combination, side members, and a plurality of cross members fixed thereto at intervals less than the arcuate dimension of the tire tread in close proximity to its supporting surface, said side members having interengaging parts whereby the whole is adapted to encircle the tire, an auxiliary cross member adjacent one end of said side members and arranged for longitudinal movement with respect to the latter for increasing the free terminal extent thereof in mounting, and spring means urging said member toward midway position between adjacent fixed cross members when the chain is mounted.

In testimony whereof I affix my signature in the presence of two witnesses.

WALTER L. SMITH.

Witnesses:
H. M. SEAMANS,
L. A. WATSON.